United States Patent [19]

Tada et al.

[11] Patent Number: 4,869,090

[45] Date of Patent: Sep. 26, 1989

[54] METHOD OF PROCESSING BASE PLATE FOR MAGNETIC DISC

[75] Inventors: Masuo Tada, Osaka; Kazuhiko Akamatsu, Hyogo; Takaaki Fukumoto, Hyogo; Toshiaki Ohmori, Hyogo; Tadashi Hyono, Hyogo, all of Japan

[73] Assignee: Mitsubishi Denki Kabushiki Kaisha, Tokyo, Japan

[21] Appl. No.: 266,705

[22] Filed: Nov. 3, 1988

[30] Foreign Application Priority Data

Dec. 11, 1987 [JP] Japan .................................. 62-313668

[51] Int. Cl.⁴ .............................................. B24C 1/00
[52] U.S. Cl. ............................................ 72/53; 51/320
[58] Field of Search ....................... 72/53; 51/320, 321

[56] References Cited

U.S. PATENT DOCUMENTS

| | | | |
|---|---|---|---|
| 4,038,786 | 8/1977 | Fong | 51/320 |
| 4,703,590 | 11/1987 | Westergaard | 51/320 |
| 4,707,951 | 11/1987 | Gibot et al. | 51/320 |

FOREIGN PATENT DOCUMENTS

| | | | |
|---|---|---|---|
| 3505675 | 8/1986 | Fed. Rep. of Germany | 51/320 |
| 0223563 | 12/1983 | Japan | 51/320 |
| 0141474 | 7/1985 | Japan | 51/320 |
| 29418 | 2/1986 | Japan . | |
| 1397102 | 6/1975 | United Kingdom | 51/320 |

*Primary Examiner*—David Jones
*Attorney, Agent, or Firm*—Lowe, Price, LeBlanc, Becker & Shur

[57] ABSTRACT

A method for forming a fine unevenness over a surface of a base plate (9) for a magnetic disc comprises the step of bombarding the surface of the base plate (9) with a jet of gas mixed with fine ice particles (4) that are formed by mixing a flow of fine pure water droplets from a spray (2) and a counter directed flow of nitrogen gas cooled by being bubbled through a quantity of liquid nitrogen held in a reservoir (6). The obtained unevenness can be controlled by varying the size of the ice particles, the jet pressure, the distance between the jet nozzle providing the size of the ice particle jet and the receiving surface of base plate (9), the duration of spraying and the spraying angle with respect to the base plate.

3 Claims, 2 Drawing Sheets

100μm

METHOD OF PROCESSING BASE PLATE FOR MAGNETIC DISC

BACKGROUND OF THE INVENTION

1. Field of the Invention

The present invention relates to a method of processing a base plate for a magnetic disc, and, more particularly to a method of processing a surface of a base plate for a magnetic disc of a high record density, e.g., a magnetic disc having a plated or sputtered magnetic film, thereby improving lubricity and durability of the disc.

2. Description of the Prior Art

In general, a magnetic disc coated with a magnetic thin film must withstand abrasive forces and shocks caused by contact with a magnetic head when the rotational motion of the disc is started or ceased. Usually, therefore, a $SiO_2$ film is provided so as to cover and protect the magnetic film formed on the base disc, and a liquid or solid lubricant is applied to the protective film. It is preferred to use a base plate having an Al alloy surface, a plated metal surface or an anodized Al alloy surface, depending on the magnetic medium provided thereon. The surface of the base plate is processed so as to have a predetermined smoothness, before a magnetic film is formed thereover.

When a Ni-P surface plated on a base plate of an Al alloy is polished with a polishing cloth and a polishing solution of colloidal silica containing ultra-fine particles of silica, the surface is finished to have a very small unevenness of about 50 Å in height. A magnetic disc may be completed by providing a $SiO_2$ protective film over a magnetic film formed on the finished base disc and also applying a liquid lubricant to the protective film. With the magnetic disc thus completed, the liquid lubricant and water droplets condensed from air spread thin between the disc surface and a magnetic head when the magnetic head rests on the magnetic disc. As a result, the magnetic disc and head become sticky to each other due to surface tension of the thin liquid therebetween and then it becomes hard to initiate rotation of the magnetic disc. Further, since the surface of the magnetic disc is so flat the coefficient of friction between the magnetic disc and head becomes large, and scratches then tend to be caused on the disc surface.

In view of the above described problems, the Japanese Patent Laying-Open Gazette No. 61-29418 (1986) discloses a method for intentionally realizing a prescribed fine unevenness over a magnetic disc surface. In that method, a lapping film is brought into contact with a given pressure with a surface of a base disc in a rotational state, Abrasive grains on the lapping film causes a fine unevenness over the base disc surface. However, in the event that the abrasive grains aggregate to larger particles, significant scratches are sometimes caused on the base disc surface, and it is also likely that dust is caused by separation of the abrasive grains from the lapping film and abrasion of the base disc surface.

SUMMARY OF THE INVENTION

In view of the problems in the prior art, it is an object of the present invention to provide a method for forming a prescribed fine and uniform unevenness over a base plate for a magnetic disc without causing dust on the base plate.

According to the present invention, a method for forming a fine unevenness over a surface of a base plate for a magnetic disc comprises the step of bombarding the surface of the base plate with fine ice particles.

Accordingly, the desired fine unevenness is formed over the surface of the base plate without causing any dust. Further, with a magnetic disc comprising the base plate thus processed, the sticking force and the coefficient of kinetic friction between the magnetic disc and a magnetic head can be made small. As a result, it becomes easy to initiate rotation of the magnetic disc and also significant scratches are prevented from being formed on the magnetic disc.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
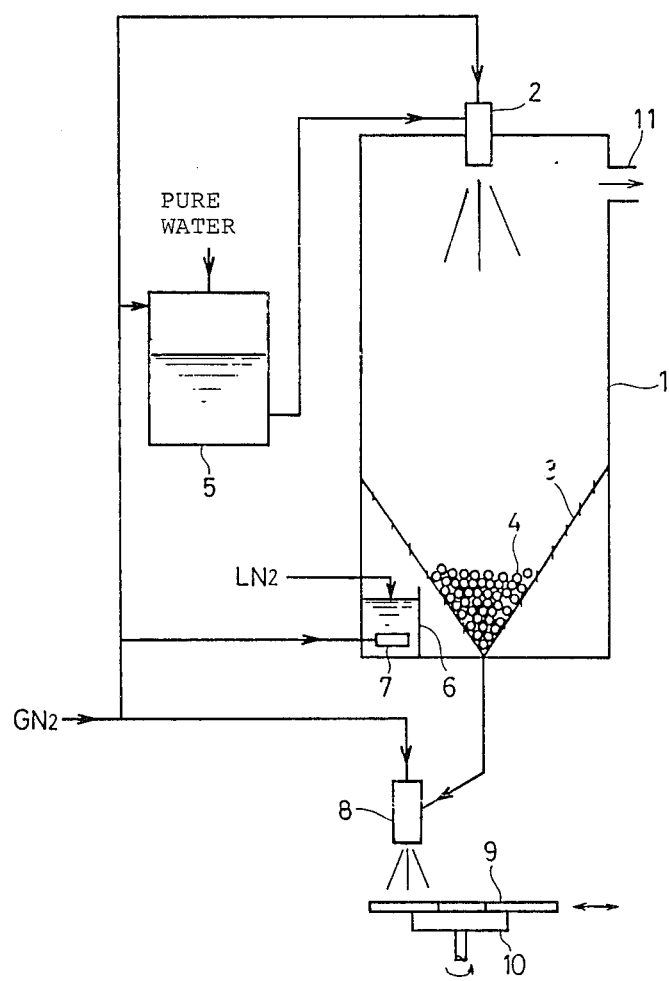
FIG. 1 is a block diagram schematically illustrating a method of processing a base plate for a magnetic disc according to an embodiment of the present invention.

Referring to FIG. 1, an insulated container 1 is 1500 mm in height and has a horizontal cross-sectional area of 400×400 mm², for example. A reservoir 6 of liquid nitrogen is provided at the bottom of the container 1. Nitrogen gas is introduced preferably at a flow rate of 300 l/min and bubbles up through a diffuser 7 in the liquid nitrogen stored in the reservoir 6. At that time, the liquid nitrogen evaporates in the bubbles and cool nitrogen gas is generated, while the bubbling nitrogen gas itself is also cooled by the liquid nitrogen. The cool gas goes up through meshes 3 in the container 1 and goes out through an outlet 11.

Pure water is sprayed in the form of a fog of fine drops from a spray nozzle 2 into the cool nitrogen gas in the container 1. The sprayed fog is instantly frozen into fine ice particles 4 that are deposited on the meshes 3.

The pure water is supplied, preferably at a flow rate of 0.2 l/min under a pressure of 4.0 kg/cm²G, to the spray nozzle 2 from a tank 5 pressurized by nitrogen gas. The nozzle 2 is also supplied, preferably with nitrogen gas at a flow rate of 10 l/min under a pressure of 4.0 kg/cm². Under these spray conditions, ice particles 4 are produced, preferably in a particle size of about 100 μm. The particle size can be controlled variously by adjusting the quantities of the water and gas supplied to the nozzle and the spraying pressure.

Ice particles 4 collected by the meshes 3 are jetted from a jet nozzle 8 toward a surface of a base plate 9 for a magnetic disc. The jet nozzle 8 may be of an ejector type which works with a high gas pressure. For example, nitrogen gas or dried air is introduced into the jet nozzle 8, preferably at a flow rate 0.6 m³/min under a pressure of 2.0 kg/cm²G, and then the fine ice particles 4 are jetted preferably at a flow rate of 3 l/min. The jetted ice particles bombard the surface of the base plate 9, so that an unevenness is thereby formed on the surface. Height variation in the unevenness can be controlled variously by adjusting the ice particle size, jetting pressure, distance between the jet nozzle 8 and base plate 9, and time and angle of the bombardment.

For example, an unevenness of 200 Å in height on a surface of a base plate 9 was obtained under the conditions of an ice particle size of 100 μm, a jetting pressure of 2.0 kg/cm²G, a jetting distance of 100 mm, a bombarding time of 10 sec and a bombarding angle of 90°. In this case, the base disc 9 was rotated on a turntable 10 during the bombardment with the ice particles. Further, the base disc was an Al alloy disc plated with Ni-B, and it was grounded and polished in advance to have a rather flat surface with a fine unevenness of about 50 Å in height.

Figure 2:
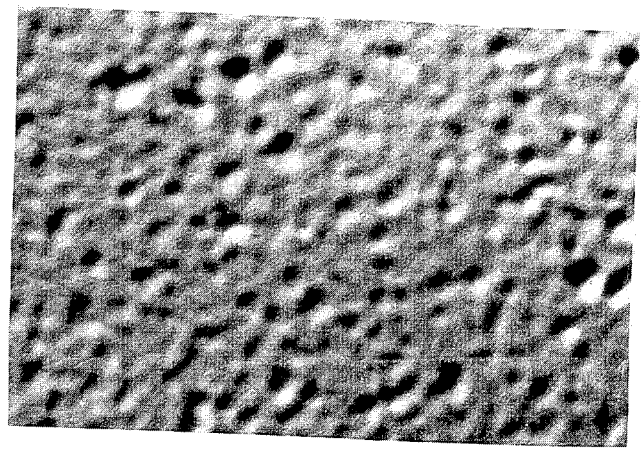
FIG. 2 is a microphotograph showing an unevenness over a surface of a base plate processed according to an embodiment of the present invention.

FIG. 2 is a microphotograph showing an unevenness formed over a surface of a base disc according to an embodiment of the present invention. Uniformity of the unevenness can be obtained by using ice particles having a uniform particle size.

TABLE I

|  | Unevenness | Sticking Force |
| --- | --- | --- |
| Prior Art Method | 50Å | 18.3 g |
| Present Method | 200Å | 2.5 g |

Table I shows the sticking force between the magnetic disc and head with respect to the unevenness on the surface of the disc. In the measurement of the sticking force, a magnetic head slider was put on a magnetic disc with a load of 10 g and held in that state for 168 hours. Then, the sticking force was measured as a force required to remove the magnetic head slider from the magnetic disc. As seen from Table I, the sticking force in the case of a magnetic disc processed according to the present invention becomes as small as 1/7 of that in the case of a conventional magnetic disc.

In other word, with a magnetic disc processed according to the present invention, it becomes easy to initiate rotation of the magnetic disc, and the coefficient of kinetic friction between the disc and a magnetic head is also reduced. Further, it is not necessary to wash a base disc after processed by a method of the present invention, because no dust is caused during the processing. Still further, an unevenness formed over a magnetic disc according to the present invention has the meritorious effect of preventing lubricant from being scattered off the disc surface, in spite of a high speed rotation of the disc.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A method for forming a controlled fine unevenness over a surface of a base plate for a magnetic recording disc, comprising the steps of:
   providing a controlled supply of nitrogen gas at a predetermined low temperature by bubbling a flow of nitrogen gas through a bath of liquid nitrogen upwardly through a fine mesh to meet a predetermined downward flow of a fog of fine water droplets that are thereby frozen into ice particles of a predetermined size on said mesh;
   collecting said frozen ice particles from the mesh, mixing said ice particles with a flow of cooled and pressurized nitrogen to thereby form, and directing a controlled jet to said cooled nitrogen and said ice particles at a predetermined angle to a surface of said base plate.

2. A method in accordance with claim 1, wherein:
   said fine ice particles are formed of pure water and have a uniform particle size of approximately 0.1 μm.

3. A method in accordance with claim 1, comprising the further step of:
   rotating said magnetic disc at a predetermined rate during said step of directing said jet of cooled nitrogen and ice particles thereat.

* * * * *